United States Patent [19]

Tominaga et al.

[11] Patent Number: 4,686,153
[45] Date of Patent: Aug. 11, 1987

[54] ELECTRODE WIRE FOR USE IN ELECTRIC DISCHARGE MACHINING AND PROCESS FOR PREPARING SAME

[75] Inventors: Haruo Tominaga, Sakura; Teruyuki Takayama; Yoshio Ogura, both of Chiba; Tetsuo Yamaguchi, Yokohama, all of Japan

[73] Assignee: Fujikura Ltd., Tokyo, Japan

[21] Appl. No.: 804,816

[22] Filed: Dec. 4, 1985

[30] Foreign Application Priority Data

Dec. 8, 1984 [JP] Japan .................................. 59-259459
May 27, 1985 [JP] Japan .................................. 60-113685

[51] Int. Cl.$^4$ ............................................. B23K 35/22
[52] U.S. Cl. ..................................... 428/610; 428/675; 428/658; 428/677; 428/941; 427/383.9; 427/406; 219/69 W; 174/126 CP
[58] Field of Search ............... 428/677, 941, 610, 658, 428/939, 935, 607, 675; 427/383.9, 406; 204/40, 37.1; 72/47; 219/69 W, 69 E, 69 M; 174/126 CP

[56] References Cited

U.S. PATENT DOCUMENTS

| | | | |
|---|---|---|---|
| 2,378,458 | 6/1945 | Avallone | 428/677 |
| 2,392,456 | 1/1946 | Brown et al. | 428/658 |
| 2,918,722 | 12/1959 | Kenmore | 428/677 |
| 4,287,404 | 9/1981 | Convers et al. | 219/69 W |
| 4,304,113 | 12/1981 | Takei et al. | 72/47 |
| 4,341,939 | 6/1982 | Briffod et al. | 219/69 W |
| 4,424,432 | 1/1984 | Kaneko et al. | 219/69 W |

FOREIGN PATENT DOCUMENTS

| | | | |
|---|---|---|---|
| 56-62730 | 5/1981 | Japan . | |
| 56-126528 | 10/1981 | Japan . | |
| 59-736 | 4/1983 | Japan | 219/69 M |
| 129626 | 7/1984 | Japan | 219/69 W |
| 645831 | 10/1984 | Switzerland | 219/69 W |
| 2069396A | 8/1981 | United Kingdom | 219/69 M |
| 476125 | 10/1975 | U.S.S.R. | 219/69 E |

*Primary Examiner*—L. Dewayne Rutledge
*Assistant Examiner*—John J. Zimmerman
*Attorney, Agent, or Firm*—Welsh & Katz, Ltd.

[57] ABSTRACT

An electrode wire for wire electric discharge machining a workpiece at high speed and high accuracy and a process for preparing the same are provided. The electrode wire comprises a core wire made of a copper clad steel wire, 10 to 70% of the sectional area of the copper clad steel wire being occupied by copper, and a copper-zinc alloy layer covering the core wire. The copper-zinc alloy layer is prepared by coating the core wire with zinc by electroplating or hot galvanizing, followed by heating to disperse copper in the zinc layer to convert the same into a copper-zinc alloy layer wherein the concentration of zinc is increased gradually along the radially outward direction. The preferable thickness of the copper-zinc alloy layer ranges from 0.1 to 15 microns and the average concentration of zinc in the copper-zinc alloy layer is preferably less than 50% by weight but not less than 10% by weight.

6 Claims, 7 Drawing Figures

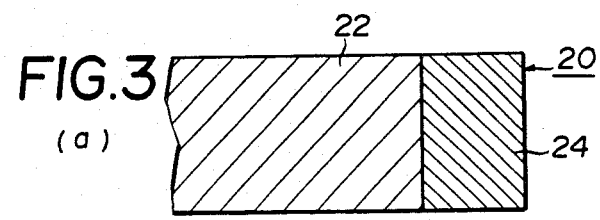
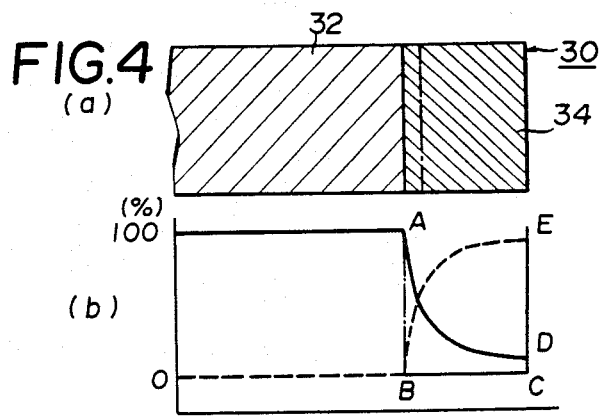
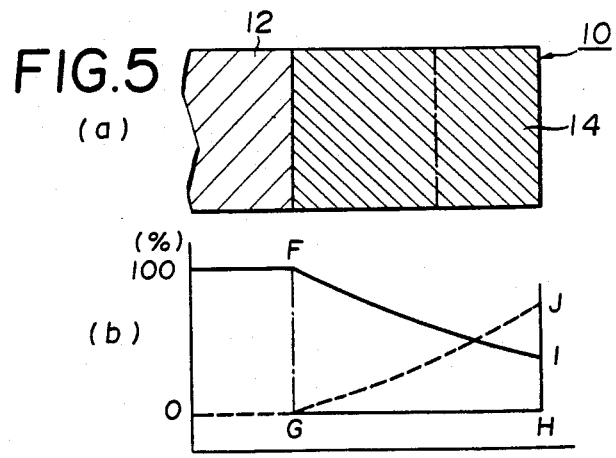

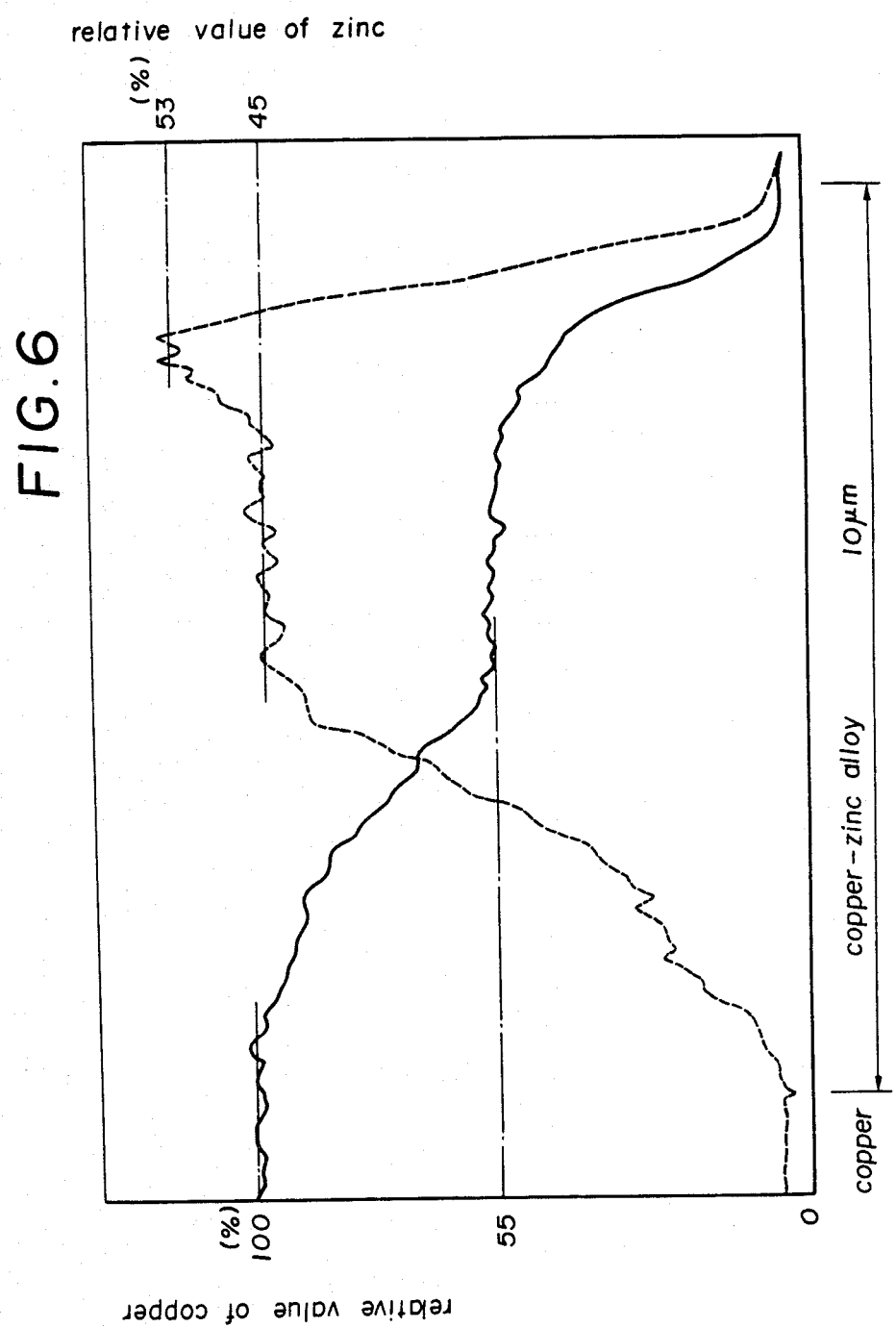

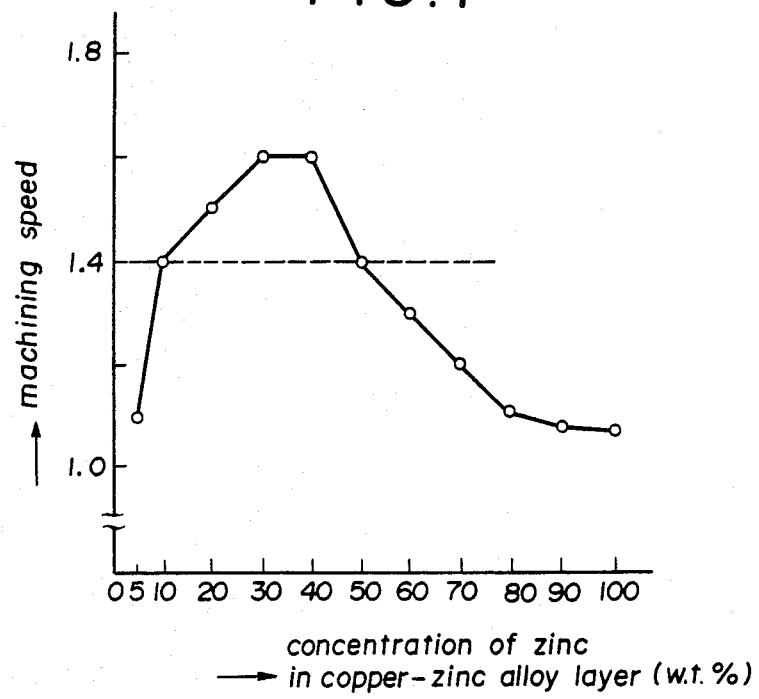

ELECTRODE WIRE FOR USE IN ELECTRIC DISCHARGE MACHINING AND PROCESS FOR PREPARING SAME

BACKGROUND OF THE INVENTION

1. Field of the Invention

The present invention relates to an electrode wire for use in a wire electric discharge machining process wherein a workpiece is machined by melting desired portions thereof by electric spark discharge. The invention relates also to a process for preparing such an electrode wire.

FIG. 1 is a schematic illustration showing a general wire electric discharge machining process, wherein a workpiece 1 is formed with a starting hole 2 through which an electrode wire 3 is inserted. The electrode wire 3 is then passed in the direction perpendicular to the workpiece 1 (in the direction shown by the arrow in FIG. 2) while applying an electric voltage between the electrode 3 and the interior wall of the hole 2 to develop spark discharge therebetween so that the workpiece 1 is melted. As the workpiece 1 is moved in the direction perpendicular to the passing direction of the electrode wire 2, the wire 2 traverses through the workpiece 1 along the desired cut line to melt the same, whereby the workpiece 1 is cut to have a desired contour. As shown in FIG. 1, the electrode wire 3 is continuously supplied from a feed reel 4 to pass over guide rollers 5 and taken up by a take-up reel 6. A tension roller 7 is disposed between one of the guide rollers 5 and the take-up reel 6 to adjust the tension applied on the electrode wire 3. Although not shown in the figure, a processing liquid is supplied to the portion which is machined by electric discharge so as to cool the electrode wire 3 and to remove debris.

The electrode wire 3 generally used in such a wire electric discharge machining process is a copper, brass (an alloy typically containing 65% of Cu and 35% of Zn) or zinc-plated brass wire having a diameter generally ranging from 0.05 mm to 0.3 mm. A tungsten or molybdenum wire may be used for special applications.

During the electric discharge machining step, the electrode wire 3 is heated to about 300° C. to be subjected to severe thermal loading while being applied with a tension from the tension roller 7 for maintaining a stable spark discharge for the accurate machining and for the increase in machining speed. It is thus required that the electrode wire 3 should have a high strength at high temperatures, particularly high tensile strength at high temperatures. Although a copper wire may be easily elongated to form a small diameter electrode wire, it is inferior in tensile strength and apt to break to reduce the efficiency of electric discharge machining operation. A brass wire has a tensile strength as high as about two times as that of a copper wire at room temperature, but the tensile strength thereof at around 300° C. is only slightly higher than that of the copper wire. It leads often to the breakdown of a brass wire when the machining speed is raised at such a high temperature with the use of the brass wire. On the other hand, although the stability of electric discharge is enhanced by the presence of a surface zinc layer when a zinc-plated brass wire is used, the strength of such a wire at high temperatures is almost the same as that of the brass wire, so that a breakdown of the wire results if the machining speed is increased. Although tungsten and molybdenum wires have high strengths at high temperatures, they are inferior in adaptability to elongation and too expensive to be used as a consumable electrode wire.

In order to overcome the aforementioned problems, it has been proposed to use an electrode wire composed of a core steel wire coated with a conductive material, such as copper or silver, and further coated with zinc. However, a satisfactory electrode wire having excellent machining properties has not yet been developed.

SUMMARY OF THE INVENTION

A primary object of this invention is, therefore, to provide an electrode wire for use in wire electric discharge machining, which comprises a core including a steel wire coated with copper or another conductive material and a surface coating layer of zinc or the like.

The electrode wire for use in wire electric discharge machining of a workpiece by means of electric discharge, provided in accordance with the present invention, comprises a core wire made of a copper clad steel wire and a copper-zinc alloy layer covering the outer periphery of the core wire and having a thickness of from 0.1 to 15 microns, 10 to 70% of the sectional area of the core wire being occupied by copper.

In a preferred embodiment of the electrode wire for use in electric discharge machining, according to the invention, the concentration of zinc in the copper-zinc alloy layer is increased gradually along the radially outward direction at a predetermined concentration gradient. Preferably, the average concentration of zinc in the copper-zinc alloy layer is less than 50% but not less than 10% by weight.

The present invention also provides a process for preparing an electrode wire for use in wire electric discharge machining of a workpiece by means of electric discharge, comprising the steps of preparing a core wire made of a copper clad steel wire wherein 10% to 70% of the sectional area is occupied by copper, the step of depositing a zinc layer over the outer periphery of the core wire by electroplating, and the step of heating the core wire coated with the zinc layer so as to disperse copper in the zinc layer to convert the zinc layer into a copper-zinc alloy layer. The electroplating at the second step may be substituted for a molten zinc plating so that a zinc layer covering the outer periphery of the core wire is formed.

BRIEF DESCRIPTION OF THE DRAWINGS

FIG. 3 shows a longitudinal section of a portion of the electrode wire which has not yet been subjected to heating treatment, and shows the concentration distribution of copper and zinc;

FIG. 4 shows a longitudinal section of a portion of the electrode wire which has been subjected to insufficient heating treatment, and shows the concentration distribution of copper and zinc;

FIG. 5 shows a longitudinal section of a portion of the electrode wire which has been subjected to sufficient heating treatment, and shows the concentration distribution of copper and zinc;

FIG. 6 is an illustration showing the results of measurement of copper and zinc of the electrode wire of FIG. 5; and FIG. 7 is a graph showing the machining speed in terms of the concentration of zinc in copper-zinc alloy layer.

DESCRIPTION OF THE PREFERRED EMBODIMENTS OF THE INVENTION

In an electrode wire for use in wire electric discharge machining, the conductivity of the copper clad steel wire is reduced to result in a lack of the machining current which lowers the machining speed, if the ratio of the cross-sectional area of the copper to the total cross-sectional area of the copper clad steel wire is less than 10%; whereas the strength of the wire at high temperatures is decreased to result in easy breakdown of the wire, if the ratio is more than 70%. In the case of an electrode wire having no copper-zinc alloy layer, the copper layer is exposed at the surface thereof, so that the copper is liable to be deposited on the surface of the workpiece, which makes the electric discharge unstable to extremely lower the machining speed. If the thickness of the copper-zinc alloy layer is less than 0.1 micron, a sufficient machining speed cannot be obtained for the reasons as described above for the wire having no copper-zinc alloy layer. On the contrary, if the thickness of the copper-zinc alloy layer is increased to more than 15 microns, the manufacturing costs will increase but the machining speed will not be further improved. It has been found that an electrode wire having a copper-zinc alloy layer formed thereon provides an improved machining speed as compared with an electrode wire only with a zinc layer. This is the reason why only the copper-zinc alloy layers are taken into consideration.

Figure 1:
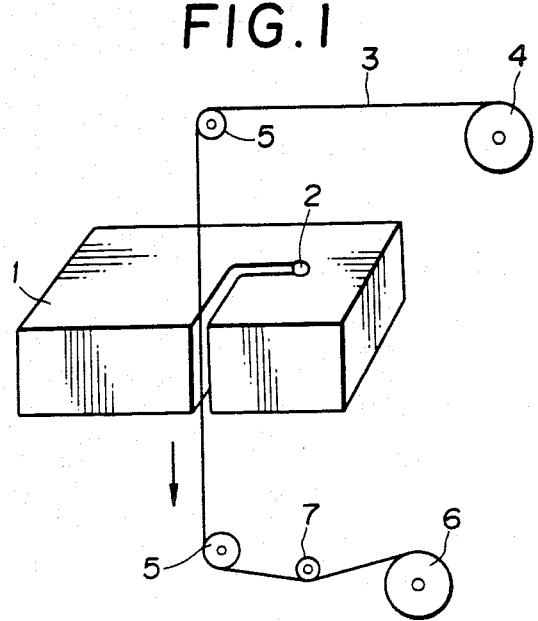
FIG. 1 is a schematic illustration showing the process for electric discharge machining of a workpiece while using an electrode wire.
Figure 2:
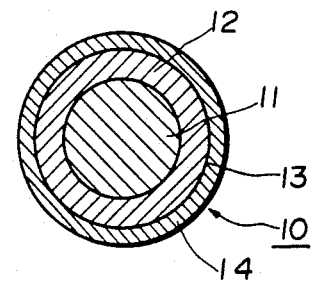
FIG. 2 is a sectional view of the electrode wire according to the first and second embodiments of the invention.

Referring now to FIG. 2, an electrode wire 10, which is a first embodiment of the invention for use in electric discharge machining process, comprises a copper clad steel wire 13 including a steel core wire 11 covered with a copper coating layer 12 of a uniform thickness, and a copper-zinc alloy layer 14 of generally uniform thickness ranging within 0.1 to 15 microns. The electrode wire 10 has a diameter of about 0.2 mm.

The copper clad steel wire 13 includes a core wire made of steel or iron-steel alloy and a copper coating layer covering the steel core wire at a coating ratio of 10 to 70%. The term "coating ratio" as herein used in the specification means the ratio of the sectional area occupied by the coating copper layer based on the total cross-sectional area of the copper clad steel wire.

The electrode wire 10 for use in electric discharge machining process may be prepared through the following steps. For example, a 0.49 mm diameter copper clad steel wire is dipped in a zinc chloride bath (an aqueous solution containing 42 g/liter of zinc chloride and 210 g/liter of ammonium chloride), followed by electroplating, to deposit a zinc layer of desired thickness over the outer periphery of the copper clad steel wire. Using an oven, the copper clad steel wire coated with the zinc layer is heated at about 380° C. for seven hours in air to disperse copper into the zinc layer to convert the zinc layer into a copper-zinc alloy layer. Thereafter, the wire is elongated so that the wire has a diameter of 0.2 mm. The heating step and the elongation step may be reversed, so that the wire coated with zinc is elongated subsequent to the electroplating step and then the elongated wire is subjected to heating treatment.

Since the thus prepared electrode wire 10 has a core made of a copper clad steel wire 13, it has a high strength at high temperatures and a high conductivity, and in addition it is excellent in electric discharge stability due to the presence of the copper-zinc alloy layer 14. Adhesion of copper to the workpiece during the electric discharge machining step is prevented by the provision of the copper-zinc alloy layer 14.

The advantageous performance characteristics of the electrode wire for use in electric discharge machining process, prepared following to the aforementioned procedure, will now be described with reference to some experimental runs.

In the following experiments, a variety of electrode wire samples, each having a diameter of 0.2 mm, were produced by varying the coating ratio of copper in the copper clad steel wire 13 and by varying the thickness of the copper-zinc alloy layer 14. As the control samples, a copper wire and a brass wire (Cu: 65%, Zn: 35%), each having a diameter of 0.2 mm, were used as the electrode wire in the wire electric discharge machining process. The machining speed, accuracy in machining and frequency of breakdown of each of the electrode wire samples, copper wire and brass wire were compared and appraised.

The results of comparison are shown in Table 1. In the experiments, using each of the wires, a 20 mm thick workpiece made of an alloy of JIS Alloy Code No. SKD-11 was cut to separate a 30 mm square plate therefrom under the following conditions:

| | |
|---|---|
| Applied voltage: | 110 volts |
| Pulse time: | ON → 5 microseconds |
| | OFF → 5 microseconds |
| Peak current: | 10 amperes |
| Condenser capacity: | 0.8 microfarads |
| Processing liquid: | Pure water |
| Tension applied on the wire: | 750 gf (gram force) |

The machining speed was indicated on the basis of the unit machining speed which was attained by the use of the copper wire (0.8 mm/min). The accuracy in machining was determined by measuring and calculating the error range of the

TABLE 1

| Electrode Wire | Copper Coating Ratio (%) | Thickness of Copper-Zinc Alloy Layer (micron) | Machining Speed | Accuracy in Machining | Frequency of Breakdown of the Wire |
|---|---|---|---|---|---|
| Electrode | 5 | 2 | 1.10 | A | B(1) |
| Wire | 10 | 2 | 1.20 | A | A |
| Having | 20 | 2 | 1.50 | A | A |
| Copper-Zinc | 50 | 2 | 1.70 | A | A |
| Alloy Layer | 70 | 2 | 1.70 | A | A |
| | 80 | 2 | 1.70 | B | B(2) |
| | 10 | 0.05 | 1.10 | A | A |
| | 10 | 0.1 | 1.20 | A | A |

TABLE 1-continued

| Electrode Wire | Copper Coating Ratio (%) | Thickness of Copper-Zinc Alloy Layer (micron) | Machining Speed | Accuracy in Machining | Frequency of Breakdown of the Wire |
|---|---|---|---|---|---|
| | 10 | 5 | 1.30 | A | A |
| | 10 | 15 | 1.40 | A | A |
| | 70 | 0.05 | 1.10 | B | B(2) |
| | 70 | 0.1 | 1.50 | A | A |
| | 70 | 5 | 1.70 | A | A |
| | 70 | 15 | 1.70 | A | A |
| Copper Wire | — | — | 1.00 | C | C |
| Brass Wire | — | — | 1.20 | B | C | dimensions of the cut-out plate to learn the difference between the maximum dimension and the minimum dimension, and evaluated in the order of A (less than 0.01 mm), B (0.01 to 0.03 mm) and C (more than 0.03 mm). The frequency of breakdown of the wire was indicated by A (stable operation without breakdown of the wire), B(1) (the wire was broken at a high machining speed), B(2) (the wire was broken when a tension of more than 750 gf was applied) and C (the wire was frequently broken).

As will be seen from Table 1, the electrode wires for use in electric discharge machining process, prepared in accordance with the aforementioned procedure and having a coating ratio of from 10 to 70% and a thickness of the copper-zinc alloy layer of from 0.1 to 15 microns, are superior over the the conventional electrode wires including the copper and brass wire in machining speed and accuracy in machining and are subjected to fewer breakdowns than the conventional wires.

If the coating ratio of copper in the copper clad steel wire is outside of the defined range (see the samples shown in Table 1 and having the coating ratios of 5% and 80%), the wires are apt to break frequently. Although the coating ratio is in the defined range of from 10% to 70%, the wire having a thickness of the copper-zinc alloy layer of less than the defined range (see the sample shown in Table 1, wherein the thickness of the copper-zinc layer is 0.05 microns) is inferior in machining speed, accuracy in machining and frequency of breakdown, while the wire having a thickness of the copper-zinc alloy layer of more than 16 microns is not economical and will provide no further improvement in machining speed and accuracy.

An electrode wire for use in electric discharge machining was prepared from a 0.196 mm diameter copper clad steel wire having a coating ratio of 60% by electroplating with zinc in a zinc sulfate bath (an aqueous solution containing 0.14 mol/liter of sulfuric acid and 0.23 mol/liter of zinc sulfate) to form a 2 micron thick zinc layer, followed by heating in an oven at about 380° C. for an hour in air. Another electrode wire was prepared by heating the same core wire coated with the same zinc layer in an electric furnace filled with a nitrogen gas and maintained at about 380° C. over a period of one hour. The both electrode wires were subjected to comparison tests similar to the aforementioned comparison test to reveal that the wires had excellent performance characteristics comparable to those of the samples fulfilling the essential condition of the invention as described hereinbefore.

Thus, the step of heating the copper clad steel wire having the outer periphery coated with the zinc layer to convert the same into a copper-zinc alloy layer is the important and critical step for the preparation of excellent electrode wire for use in electric discharge machining process.

Another process for preparing an electrode wire for use in electric discharge machining process, according to this invention will now be described.

The process comprises the step of applying a copper clad steel wire, for example having a diameter of 0.49 mm, with zinc by hot galvanizing (for example, by passing the wire through a molten zinc bath maintained at 450° C. and then passing the wire through a bed of pulverized charcoal having a particle size of not more than 30 meshes to squeeze the excess zinc) to form a copper-zinc alloy layer of desired thickness over the outer periphery of the copper clad steel wire and simultaneously to form a zinc layer covering the copper-zinc layer and having a desired thickness, the step of cooling and elongating the wire to have a diameter of 0.2 mm, and the step of heating the elongated were in an oven to promote the growth of copper-zinc phase so that the zinc layer is completely converted into a second copper-zinc alloy layer. The sequential order of the elongation step and the heating step in this process may be reversed.

This process has advantages that the time required for the formation of zinc layer is decreased as compared to the electroplating, and that the time required for heating treatment is also decreased since a copper-zinc alloy layer having a thickness of more than 0.1 microns is formed at the hot galvanizing step, whereby the production efficiency can be improved.

Various electrode wire samples were prepared in accordance with this process by varying the coating ratio of copper in the copper clad steel wire and by varying the thickness of the copper-zinc alloy layer, and the thus prepared samples were subjected to comparison tests similar to the aforementioned procedure to obtain similar excellent results as those shown in Table 1.

The electrode wire for use in electric discharge machining, according to the invention, provides the following merits.

(a) Since a copper clad steel wire having a copper coating ratio of from 10 to 70% is used, the wire has a high strength at high temperatures while retaining a high conductivity.

(b) Since the outer periphery of a copper clad steel wire having a high conductivity is coated with a copper-zinc alloy layer having a thickness of more than 0.1 micron but not more than 15 microns, the electric discharge stability is improved and adhesion of copper to the workpiece, otherwise caused by the use of a wire having a copper layer exposed on the surface thereof, is prevented to provide accuracy in machining and to allow the machining current to increase to enhance the machining speed.

In summary, in the electrode wire for use in wire electric discharge machining according to the invention, the properties of steel, copper and copper-zinc alloy are utilized favorably and most suitably to exhibit synergistic functions to provide the merits (a) and (b) set forth above.

From the observation of the aforesaid examples by a microscope or the like, it has been found that the improved features of the wires have a close relationship to the presence of the copper-zinc alloy layer formed through the heat treatment and that the most preferable features of the wires can be obtained when the zinc layer is entirely converted into the copper-zinc alloy layer in such a manner that the concentration of the zinc is gradually decreased along the radially inward direction to form an alloy layer of a multilayer construction. A copper-zinc alloy layer of such a multilayer construction can be formed through a heat treatment.

In a preferred embodiment, the average concentration of zinc in the copper-zinc alloy layer 14 is adjusted to be less than 50% but not less than 10% by weight, and the concentration of zinc in the copper-zinc alloy layer is increased gradually along the radially outward direction, whereby the machining performance characteristics of the wire is further improved.

A second embodiment of the invention characterized by the aforementioned preferred features will now be described.

An electrode wire according to this preferred embodiment has a structure similar to the electrode wire 10 shown in FIG. 2 except that the average concentration of zinc in the copperzinc alloy layer 14 is controlled to be less than 50% but not less than 10% by weight, and the concentration of zinc in the copper-zinc alloy layer is increased gradually along the radially outward direction.

Such an electrode wire for use in wire electric discharge machining may be prepared through the following process. A copper clad steel wire having, for example, a diameter of 0.49 mm is dipped in a zinc chloride bath (an aqueous solution containing 42 g/liter of zinc chloride and 210 g/liter of ammonium chloride), followed by electroplating, to form a zinc layer having a desired thickness over the outer periphery of the copper clad steel wire. Then, the copper clad steel wire coated with the zinc layer is elongated to have an outer diameter of 0.2 mm, and this elongated wire is heated at 300° C. for an hour in an inert gas (such as nitrogen gas atmosphere) in a non-oxidative oven to disperse copper into the zinc layer to convert the zinc layer into a copper-zinc alloy layer completely. The wire may be heated after the electroplating step, and then elongated.

Since the thus prepared electrode wire 10 has a core made of a copper clad steel wire 13, it has a high strength at high temperatures and a high conductivity. In addition, it is excellent in electric discharge capacity, since the average concentration of zinc in the copper-zinc alloy layer 14 is controlled within the range of from not less than 10% by weight to less than 50% by weight and the concentration of zinc in the copper-zinc alloy layer is gradually increased along the radially outward direction at a predetermined gradient. Adhesion of copper to the work piece during the electric discharge machining step is prevented by the provision of the copper-zinc alloy layer 14. A uniform thick zinc layer can be deposited over the outer periphery of the core wire by electroplating, followed by heating to convert the zinc layer into the copper-zinc alloy layer in its entirety, to result in formation of uniform thick copper-zinc alloy layer 14.

The advantageous performance characteristics of the electrode wire for use in electric discharge machining process, according to the second embodiment of the invention, will now be described with reference to some experimental data.

In accordance with this second embodiment, a variety of electrode wire samples, each having a diameter of 0.2 mm, were produced by varying the coating ratio of copper in the copper clad steel wire 13 and by varying the thickness of the copper-zinc alloy layer 14 having an average concentration of zinc within the range of not less than 10% by weight and less than 50% by weight and having a concentration gradient such that the concentration of zinc therein is increased gradually along the radially outward direction. As the control samples, a copper wire and a brass wire (Cu: 65%, Zn: 35%), each having a diameter of 0.2 mm, were used as the electrode wires in the wire electric discharge machining process. The machining speed, accuracy in machining, frequency of breakdown of each wire (showing the strength of each wire at high temperatures and the stability at the spark discharge step) and economical evaluation of each of the electrode wire samples, copper wire and brass wire were compared and appraised.

The results of comparison are shown in Table 2. In Table 2, B(3) indicates that the electrode wire was broken at the initial stage of spark discharge, i.e., at the time of initiating the spark discharge between the electrode wire and the work piece.

As will be seen from Table 2, the electrode wires for use in electric discharge machining process, prepared in accordance with the second embodiment and having a copper

TABLE 2

| Electrode Wire | Copper Coating Ratio (%) | Thickness of Copper-Zinc Alloy Layer (micron) | Machining Speed | Accuracy in Machining | Frenquency of Breakdown of the Wire |
|---|---|---|---|---|---|
| Electrode Wire | 5 | 2 | 1.20 | A | B(1) |
| Having Copper- | 10 | 2 | 1.50 | A | A |
| Zinc Alloy Layer | 20 | 2 | 1.60 | A | A |
| (Average | 50 | 2 | 1.90 | A | A |
| Concentration of | 70 | 2 | 2.00 | A | A |
| Zinc is less than | 80 | 2 | 1.70 | B | B(2) |
| 50% and not less | 10 | 0.05 | 1.20 | A | A |
| 10%) | 10 | 0.1 | 1.40 | A | A |
| | 10 | 5 | 1.70 | A | A |
| | 10 | 15 | 1.80 | A | A |
| | 70 | 0.05 | 1.20 | B | B(2) |
| | 70 | 0.1 | 1.60 | A | A |

TABLE 2-continued

| Electrode Wire | Copper Coating Ratio (%) | Thickness of Copper-Zinc Alloy Layer (micron) | Machining Speed | Accuracy in Machining | Frenquency of Breakdown of the Wire |
|---|---|---|---|---|---|
| | 70 | 5 | 2.00 | A | A |
| | 70 | 15 | 2.00 | A | A |
| Copper Wire | — | — | 1.10 | C | C |
| Brass Wire | — | — | 1.20 | B | C |
| Brass Wire Plated with Zinc | — | — | 1.40 | B | B(3) |
| Copper Clad Steel Wire Coated with Copper-Zinc Alloy | 50 | *2 | 1.40 | B | B(3) |

Note *The copper-zinc alloy layer with * is composed of 65 wt. % of copper and 35 wt. % of zinc but has no concentration gradient of zinc along the radially outward direction.

coating ratio of from 10% to 70% and a thickness of the copper-zinc alloy layer of from 0.1 to 15 microns (wherein the average concentration of zinc is not less than 10% by weight and less than 50% by weight, and the concentration of zinc is gradually increased along the radially outward direction), are superior over the conventional electrode wires including the copper and brass wires in machining speed, accuracy in machining, and resistance to breakdown.

The electrode wire, according to the second embodiment of the invention wherein the concentration of zinc in the copper-zinc alloy layer is increased gradually, is further improved in machining speed, accuracy in machining and resistance to breakdown, when compared with the copper clad steel wire coated with a copper-zinc alloy layer wherein the concentration of zinc is not changed gradually.

When the thickness of the copper-zinc alloy layer exceeds 15 microns, the manufacturing costs will increase but a further improvement in machining speed, accuracy and resistance to breakdown will not be expected.

The relation between the concentration gradient of zinc and the kinds of copper-zinc alloys formed will now be briefly described. The copper-zinc alloy layer formed through the heating step under certain conditions includes from the outer surface thereof an $\epsilon$ phase alloy layer (Zn: about 80%), a $\gamma$ phase alloy layer (Zn: about 65%), a $\beta$ phase alloy layer (Zn: about 45%) and an $\alpha$ phase alloy layer (Zn: about 35%), the $\epsilon$, $\gamma$, $\beta$ and $\alpha$ phases being those used in a Hansen's phase diagram.

The copper-zinc alloy layer having a certain concentration gradient of zinc indicates that the layer includes some of the above-described different phase alloy layers. Upon an extensive study of the relation between the formation of the alloy layers and the machining performance, it has been found that the machining speed is remarkably improved when the copper-zinc alloy layer formed on the wire includes the alloy layer having the concentration of zinc of 40 to 50% by weight, that is the $\beta$ phase alloy layer.

The average concentration of zinc in the copper-zinc alloy layer is preferably controlled within the range of not less than 10% by weight and less than 50% by weight, for the following reasons. FIG. 3(a) shows a longitudinal section of a portion of an electrode wire 20 which has not yet been subjected to heating treatment. The electrode wire 20 comprises a copper clad layer 22 covering the outer periphery of a steel wire, and a uniform thick zinc layer 24 covering the outer periphery of the copper clad layer 22. FIG. 3(b) shows the concentration distribution of copper in the copper layer 22 and the concentration distribution of zinc in the zinc layer 24 in the electrode wire shown in FIG. 3(a) (the concentration of copper being shown by the real line and the concentration of zinc being shown by the broken line). The ordinate of FIG. 3(b) represents the percentage of concentration of copper and zinc, and the abscissa of the figure represents the radial location of the electrode wire 20. As seen from FIGS. 3(a) and 3(b), since the electrode wire 20 has not yet been subjected to heating treatment, no thermal dispersion is found and no copper-zinc alloy layer is formed in the outermost layer of the electrode wire 20.

FIG. 4(a) shows a longitudinal section of a portion of an electrode wire 30 which has been subjected to insufficient heating treatment. The electrode wire 30 has a copper layer 32 covering the outer periphery of a steel wire, and a copperzinc alloy layer 34 covering the outer periphery of the copper layer 32. Referring to FIG. 4(b) to inspect the concentration distributions of copper and zinc in the copper-zinc alloy layer 34 (the concentration of copper being shown by the real line and the concentration of zinc being shown by the broken line), it is found that the area BCE is larger than the area ABCD. This means that the average concentration of zinc is more than 50% by weight.

FIG. 5(a) shows a longitudinal section of a portion of an electrode wire 10 which has been subjected to sufficient heating treatment. The electrode wire 10 has a copper layer 12 covering the outer periphery of the steel wire, and a copper-zinc alloy layer 14 covering the outer periphery of the copper layer 12. Referring to FIG. 5(b) to inspect the concentration distributions of copper and zinc in the copper-zinc alloy layer 14 (the concentration of copper being shown by the real line and the concentration of zinc being shown by the broken line), it is found that the area GHJ is smaller than the area FGHI. This means that the average concentration of zinc is less than 50% by weight.

The concentration gradient of zinc will now be more fully described with reference to FIG. 6 which illustrates the results of measurement of the copper and zinc at a cross-section section of the electrode wire identified by FIG. 5.

In FIG. 6, the solid line represents the relative value of the copper to the zinc measured by an electron probe micro analyzer (EPMA), while the broken line represents the relative value of zinc to the copper measured by the same EPMA. It will be appreciated from FIG. 6 that the relative value of the zinc or the concentration of zinc, at the surface of the wire is 53%, however that the average concentration of copper of the copper-zinc alloy layer having a thickness of 10 microns exceeds 50%. In other words, the average concentration of zinc of the alloy layer is less than 50%. It should be noted that the broken line representing the concentration of zinc in FIG. 6 has a plateau at the concentration level of 45%. Some examples show that the concentration of zinc may have a plurality of plateaus and that the plateaus may appear at concentration levels of other than 45%.

Electrode wire samples were prepared by changing the temperature and time of the heating treatment to vary the average concentration of zinc in the copper-zinc alloy layer, and the samples including those shown in FIGS. 3(a), 3(b), 4(a), 4(b), 5(a) and 5(b) were then subjected to comparison tests to learn the difference in machining speed of respective samples. The results are shown in FIG. 7. The ordinate of FIG. 7 represents the average concentration of zinc in the copper-zinc alloy layer and the abscissa of FIG. 7 represents the machining speeds of the electrode wires, each comprising a copper clad steel wire having a coating ratio of 50% and a 1 micron thick copper-zinc alloy layer, on the basis of the machining speed of a brass wire. The machining speed of a zinc-plated brass wire which was used as a control example was 1.4 times as high as that of the brass wire, the result being plotted by the broken line in FIG. 7.

It should be apparent from FIG. 7 that the electrode wires, each comprising a copper clad steel wire having a coating ratio of copper of 50% and a 1 micron thick copper-zinc alloy layer containing zinc in an average concentration of not less than 10% by weight and less than 50% by weight, are higher in machining speed than that obtainable by the use of a control sample made of a zinc-plated brass wire.

The spark discharge characteristics of the electrode wire according to the second embodiment of the invention is thus further improved by the provision of a 0.1 to 15 micron thick copper-zinc alloy layer covering the outer periphery of a highly conductive copper clad steel wire and having an average concentration of zinc of not less than 10% by weight and less than 50% by weight, with the concentration of zinc being increased at a substantially linear gradient along the radially outward direction.

What is claimed is:

1. In an electrode wire for use in machining a workpiece by means of electric spark discharge, said electrode wire comprising:
    a core wire including steel wire having a copper cladding, said copper cladding having a cross-sectional area approximately 10 to 70 percent of the cross-sectional area of said core wire;
    a copper-zinc alloy layer over said core wire, said alloy layer having a thickness of from 0.1 to 15 microns, and an average zinc concentration being less than 50% by weight of the alloy layer weight, but not less than 10% by weight of the alloy layer weight, the concentration of zinc in said copper-zinc alloy layer increasing gradually in a radially outward direction to result in an alloy layer portion having a zinc concentration from 40% to 50% by weight.

2. In an electrode wire for use in wire electric discharting machining a workpiece by means of electric spark discharge, said wire comprising an inner core portion of steel wire, an intermediate copper cladding, an outer copper-zinc alloy layer, said outer layer having a thickness of from 0.1 to 15 microns, said intermediate layer comprising 10 to 70% of the sectional area of said combined inner core portion and said intermediate layer, said outer layer having a concentration of zinc which radially increases gradually the average concentration of zinc in said outer layer being less than 50% by weight but not less than 10% by weight of said outer layer.

3. A process for preparing an electrode wire for use in machining a workpiece by means of electric spark discharge, comprising the steps of:
    (a) preparing a core wire of copper clad steel wire having 10 to 70% of the cross-sectional area of said core wire being copper;
    (b) coating said core wire with a zinc layer by electroplating;
    (c) elongating said core wire coated with said zinc layer; and
    (d) heating said zinc coated core wire to disperse copper into said zinc layer, thereby converting said zinc layer into a copper-zinc alloy layer having a thickness of from about 0.1 to about 15 microns and an average concentration of zinc of less than 50% but not less than 10% by weight, heating said zinc coated core wire to gradually increase the concentration of zinc within said copper-zinc alloy layer in a radially outward direction thereby forming an integral layer in said copper-zinc alloy layer having a zinc concentration from about 40% to about 50% by weight of said integral layer.

4. A process for preparing an electrode wire for use in machining a workpiece by means of electric spark discharge, comprising the steps of:
    (a) preparing a core wire of a copper clad steel wire having 10 to 70% of the cross-sectional area of said core wire being copper;
    (b) coating said core wire with a zinc layer by electroplating;
    (c) heating said zinc coated core wire to disperse copper into said zinc layer, thereby converting said zinc layer into a copper-zinc alloy layer having an average concentration of zinc of less than 50% but not less than 10% by weight, heating said coated core wire to gradually increase the concentration of zinc within said copper-zinc alloy layer in a radially outward direction thereby forming an integral layer in said copper-zinc alloy layer having a zinc concentration from about 40% to about 50% by weight of said integral layer; and
    (d) elongating said core wire coated with said copper-zinc alloy layer so that the thickness of said copper-zinc alloy layer is from about 0.1 to about 15 microns.

5. A process for preparing an electrode wire for use in machining a workpiece by means of electric spark discharge, comprising the steps of:
    (a) preparing a core wire of copper clad steel wire wherein a 10 to 70% of cross-sectional area thereof is copper;
    (b) dipping said core wire in a molten zinc bath thereby forming a first copper-zinc alloy layer covering said core wire and a zinc layer on said first copper-zinc alloy layer;
    (c) elongating said coated core wire; and
    (d) heating said coated and elongated core wire to disperse copper into said first copper-zinc and zinc layers, thereby converting said zinc layer into a second copper-zinc alloy layer and increasing the zinc concentration in said first copper-zinc alloy layer, whereby the total thickness of said first and second copper-zinc alloy layers is from about 0.1 to about 15 microns, the concentration of zinc within said first and second copper-zinc alloys is gradually increased in a radially outward direction and an integral high zinc concentration is formed in said layer having a first and second copper-zinc alloy layers having a zinc concentration from 40% to 50% by weight of said integral layer.

6. A process for preparing an electrode wire for use in machining a workpiece by means of electric spark discharge, comprising the steps of:
(a) preparing a core wire of a copper clad steel wire having 10 to 70% of the cross-sectional area of said core wire being copper;
(b) dipping said core wire in a molten zinc bath thereby forming a first copper-zinc alloy layer on said core wire and a zinc layer on said first copper-zinc alloy layer;
(c) heating said coated core wire to disperse copper into said first copper-zinc and zinc layers and thereby converting said zinc layer into a second copper-zinc alloy layer and increasing the zinc concentration in said first copper-zinc alloy layer, whereby the concentration of zinc within said first and second copper-zinc alloy layers is gradually increased in a radially outward direction and said first and second copper-zinc alloy layers include an integral layer having a zinc concentration from about 40% to about 50% by weight of said integral layer; and
(d) elongating said coated core wire so that the total thickness of said first and second copper-zinc alloy layers is within the range of from about 0.1 to about 15 microns.

* * * * *